US008796344B2

(12) United States Patent
Gondo et al.

(10) Patent No.: US 8,796,344 B2
(45) Date of Patent: Aug. 5, 2014

(54) PRE-EXPANDED PARTICLES, PROCESS FOR PRODUCING THE SAME, AND EXPANDED MOLDED ARTICLE

(75) Inventors: Yuichi Gondo, Shiga (JP); Hideyasu Matsumura, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

(21) Appl. No.: 13/140,231

(22) PCT Filed: Dec. 25, 2009

(86) PCT No.: PCT/JP2009/071640
§ 371 (c)(1),
(2), (4) Date: Jun. 16, 2011

(87) PCT Pub. No.: WO2010/074246
PCT Pub. Date: Jul. 1, 2010

(65) Prior Publication Data
US 2011/0251296 A1 Oct. 13, 2011

(30) Foreign Application Priority Data
Dec. 26, 2008 (JP) ................ 2008-333885

(51) Int. Cl.
C08J 9/16 (2006.01)
C08J 9/22 (2006.01)
C08J 9/18 (2006.01)

(52) U.S. Cl.
USPC .............. 521/57; 521/56; 521/58; 521/60

(58) Field of Classification Search
USPC ............................. 521/56–60
See application file for complete search history.

(56) References Cited

U.S. PATENT DOCUMENTS

| 3,480,570 | A | * | 11/1969 | Stephenson et al. | 521/57 |
| 3,503,908 | A | * | 3/1970 | Ingram et al. | 521/59 |
| 4,304,796 | A | * | 12/1981 | Spicuzza et al. | 427/180 |
| 4,304,797 | A | * | 12/1981 | Spicuzza | 427/180 |
| 4,312,957 | A | * | 1/1982 | Spicuzza, Jr. | 521/60 |
| 4,438,058 | A | * | 3/1984 | Tanaka | 264/51 |
| 4,439,490 | A | * | 3/1984 | Schwarz | 428/407 |
| 4,603,149 | A | * | 7/1986 | Kesling et al. | 521/57 |
| 4,608,394 | A | * | 8/1986 | Ingram | 521/57 |
| 4,609,681 | A | * | 9/1986 | Ingram | 521/57 |
| 4,622,345 | A | * | 11/1986 | Kesling et al. | 521/57 |
| 4,771,081 | A | * | 9/1988 | Cox | 521/57 |
| 4,808,448 | A | * | 2/1989 | Cox | 428/36.5 |
| 5,110,835 | A | * | 5/1992 | Walter et al. | 521/57 |
| 5,110,841 | A | * | 5/1992 | Malone | 521/94 |
| 5,661,191 | A | | 8/1997 | Haraguchi et al. | |
| 5,985,943 | A | * | 11/1999 | Hahn et al. | 521/57 |
| 7,579,384 | B2 | | 8/2009 | Matsumura et al. | |
| 7,683,101 | B2 | | 3/2010 | Inada et al. | |
| 7,767,723 | B2 | | 8/2010 | Matsumura et al. | |
| 7,767,724 | B2 | | 8/2010 | Matsumura et al. | |
| 8,084,510 | B2 | * | 12/2011 | Morioka et al. | 521/59 |
| 2006/0038311 | A1 | | 2/2006 | Togou et al. | |
| 2007/0066693 | A1 | | 3/2007 | Bres et al. | |
| 2007/0243365 | A1 | | 10/2007 | Matsumura et al. | |
| 2007/0249784 | A1 | | 10/2007 | Matsumura et al. | |

FOREIGN PATENT DOCUMENTS

| EP | 0 217 516 A2 | 4/1987 | |
| EP | 0 722 974 A1 | 7/1996 | |
| EP | 1 612 239 A1 | 1/2006 | |
| JP | 62011740 A * | 1/1987 | ........... C08J 9/22 |
| JP | 63-125537 | 5/1988 | |
| JP | 02034641 A * | 2/1990 | |
| JP | 10-45940 | 2/1998 | |
| JP | 2006-206753 | 8/2006 | |
| JP | 2007-15228 | 1/2007 | |
| WO | 2004/090029 | 10/2004 | |

OTHER PUBLICATIONS

Derwent abstract for JP-02034641-A (1994).*
English-language abstract of JP-62011740-A (1987) from Japan Patent Office (JPO).*
English-language abstract of JP-02-034641 (1990) from JPO.*
U.S. Appl. No. 13/230,568 to Hideyasu Matsumura, filed Sep. 12, 2011.
International Search Report for PCT/JP2009/071640, dated Mar. 9, 2010.
Extended European Search Report issued with respect to EP Patent App. 09835042.4, dated Sep. 3, 2013.

* cited by examiner

Primary Examiner — Melissa Rioja
(74) Attorney, Agent, or Firm — Greenblum & Bernstein, P.L.C.

(57) ABSTRACT

A process for producing pre-expanded particles, comprising the steps of:
impregnating 100 parts by weight of polystyrene type resin particles with a volatile blowing agent in the presence of 0.1 to 2.0 parts by weight of a first antistatic agent to obtain expandable resin particles; and
bringing 100 parts by weight of the expandable resin particles into contact with 0.1 to 2.0 parts by weight of a second antistatic agent in the presence of an antifoaming agent, and then pre-expanding the particles, thereby obtaining pre-expanded particles, wherein
the second antistatic agent and the antifoaming agent are used in a ratio by weight of 1:0.04 to 1.50.

8 Claims, No Drawings

PRE-EXPANDED PARTICLES, PROCESS FOR PRODUCING THE SAME, AND EXPANDED MOLDED ARTICLE

TECHNICAL FIELD

The present invention relates to pre-expanded particles, a process for producing the same and an expanded molded article (molded foam). More particularly, the present invention relates to pre-expanded particles having good antistatic properties, a process for producing the same and an expanded molded article.

BACKGROUND ART

Expandable polystyrene type resin particles, which are given expandability, are obtained by impregnating polystyrene type resin particles with a volatile blowing agent such as propane, butane and pentane. The expandable polystyrene type resin particles can be stored at room temperature or in a refrigerated state, because they can retain the blowing agent well. Accordingly, an expanded molded article can be obtained by timely heating the expandable polystyrene type resin particles to obtain pre-expanded particles, and then pouring these into a mold of a molding machine and heating the same. The expanded molded article is widely used as food containers such as fish boxes, shock absorbers for home electric appliances, heat insulation materials for construction materials, and the like as having excellent heat insulating properties, shock-absorbing properties and lightweight properties.

However, expanded molded articles formed from polystyrene type resin have been disadvantageous in that they can be easily charged by friction due to their high electrical insulation properties and therefore attract dust to have poor appearance. In addition, packing materials formed from such expanded molded articles have been disadvantageous in that they cause packed contents to suffer from contamination and electrostatic breakdown by attracted dust.

The pamphlet of WO 2004/090029 (Patent Document 1) discloses a method for obtaining an antistatic styrene type resin expanded molded article. Specifically, styrene-modified olefin type resin particles are impregnated with a volatile blowing agent to obtain expandable resin particles. Thereafter, 100 parts by weight of the expandable styrene type resin particles are impregnated with 0.1 to 2.0 parts by weight of a surfactant to obtain expandable styrene type resin particles having excellent antistatic properties. The antistatic styrene type resin expanded molded article is obtained from these particles.

PRIOR ART DOCUMENTS

Patent Document

[Patent Document 1] pamphlet of WO 2004/090029

SUMMARY OF THE INVENTION

Problems to be Solved by the Invention

In the above-described method, the resin particles are impregnated with an antistatic agent at the time of the impregnation with the blowing agent.

Even with the expandable resin particles obtained by the above-described method, it is possible to obtain an expanded molded article having sufficient antistatic properties. However, for use in packing materials for electronic components, for example, further improvement in the antistatic properties, in particular, prevention of variation of the antistatic properties at plural point in a single expanded molded article has been desired. In addition, the method has been disadvantageous in that it is difficult for the method to provide good antistatic properties when used for an expanded molded article of a high expansion ratio.

Means for Solving the Problems

The present invention therefore provides a process for producing pre-expanded particles, comprising the steps of:

impregnating 100 parts by weight of polystyrene type resin particles with a volatile blowing agent in the presence of 0.1 to 2.0 parts by weight of a first antistatic agent to obtain expandable resin particles; and bringing 100 parts by weight of the expandable resin particles into contact with 0.1 to 2.0 parts by weight of a second antistatic agent in the presence of an antifoaming agent, and then pre-expanding the particles, thereby obtaining pre-expanded particles, wherein the second antistatic agent and the antifoaming agent are used in a ratio by weight of 1:0.04 to 1.50.

The present invention also provides pre-expanded particles obtained by the above-described process.

The present invention further provides an expanded molded article obtained by molding the above-described pre-expanded particles in a mold.

Effects of the Invention

The pre-expanded particles obtained according to the present invention can sustain better antistatic properties than conventional pre-expanded particles produced by being brought into contact with an antistatic agent once. In the present invention, in addition, it is possible to use antistatic agents that cannot be conventionally used due to foaming. Further, according to the present invention, it is possible to obtain an expanded molded article having antistatic properties more improved than the one formed from conventional pre-expanded particles and to sustain better antistatic properties even in the case of an expanded molded article of a high expansion ratio.

When the first antistatic agent is a nonionic surfactant and the second antistatic agent is a cationic surfactant, it is possible to obtain an expanded molded article having even better antistatic properties.

When the antifoaming agent is polyoxyalkylene glycol or polyoxyalkylene alkylether, it is possible to inhibit foaming due to the use of the second antistatic agent and to obtain an expanded molded article having even better antistatic properties.

When the step of obtaining expandable resin particles is the step of
(1) flowing the polystyrene type resin particles and the first antistatic agent in a hermetic pressure-resistant container or
(2) suspending the polystyrene type resin particles and the first antistatic agent in an aqueous medium in a hermetic pressure-resistant container, and then impregnating the flowed or suspended polystyrene type resin particles with the volatile blowing agent, it is possible to obtain an expanded molded article having even better antistatic properties.

When the step of obtaining pre-expanded particles is the step of bringing the expandable resin particles into contact with the second antistatic agent in a liquid state or a solution of the second antistatic agent in the presence of the antifoaming agent, and then pre-expanding the particles, it is possible to obtain an expanded molded article having even better antistatic properties.

When the volatile blowing agent is selected from propane, n-butane, isobutane, n-pentane, isopentane and cyclopentane, it is possible to obtain an expanded molded article having even better antistatic properties.

When the volatile blowing agent is included in the expandable resin particles at a proportion of 6 to 12% by weight, it is possible to obtain an expanded molded article having even better antistatic properties.

When the polystyrene type resin particles comprise composite resin particles of 100 parts by weight of polyolefin type resin and 120 to 560 parts by weight of polystyrene type resin, it is possible to obtain an expanded molded article having even better antistatic properties.

MODE FOR CARRYING OUT THE INVENTION

In brief, the present invention is directed to a process for producing pre-expanded particles by, in both the step of producing expandable resin particles and the step of producing pre-expanded particles, bringing both the particles into contact with antistatic agents. The present invention is also directed to a process in which, in the latter production step, foaming due to the antistatic agent is prevented with an antifoaming agent. The inventors think that both the particles are impregnated with the antistatic agents through the contact with the antistatic agents.

In the present invention, the first antistatic agent is used in the step of producing the expandable resin particles, and the second antistatic agent and the antifoaming agent are used in the step of producing the pre-expanded particles. For the first antistatic agent, the second antistatic agent and the antifoaming agent, as mentioned below, various kinds of agents can be used and combined appropriately according to desired antistatic properties. Non-limiting examples of the first antistatic agent and the second antistatic agent include nonionic surfactants, anionic surfactants, cationic surfactants and amphoteric surfactants. Non-limiting examples of the antifoaming agent include nonionic surfactants. Here, both the examples of the second antistatic agent and the examples of the antifoaming agent include nonionic surfactants, but they will never be the same agent, because an agent having excellent antistatic properties is selected for the former and an agent having excellent antifoaming properties is selected for the latter.

Hereinafter, the present invention will be described in order of the steps.

(1) First, expandable resin particles are obtained by impregnating polystyrene type resin particles with a volatile blowing agent in the presence of a specific amount of a first antistatic agent.

Examples of the polystyrene type resin particles in the present invention include particles composed of polystyrene, polymethylstyrene, styrene-acrylonitrile copolymer, styrene-acrylonitrile butadiene copolymer, styrene-acrylate copolymer, styrene-methyl methacrylate copolymer or cross-linked resin of polystyrene and polyethylene or polypropylene. These resins may be mixed, and non-polystyrene type resin may be mixed. Examples of the non-polystyrene type resin include polyolefin type resin such as polyethylene and polypropylene. Out of them, mixed resin (composite resin) of polyolefin type resin and polystyrene type resin is preferable, and composite resin of polyethylene resin and polystyrene type resin is more preferable.

The method for producing the styrene type resin particles is not particularly limited, and any commonly known method may be used. Examples thereof include a suspension polymerization method and a seed polymerization method. The seed polymerization method is to obtain styrene type resin particles by impregnating seed particles with styrene type monomer in an aqueous medium and polymerizing the same.

Here, the composite resin particles are obtained by adding styrene type monomer into an aqueous medium retaining polyolefin type resin particles dispersed therein and polymerizing the same. Hereinafter, the method for producing the composite resin particles will be described.

Polyolefin type resin particles can be obtained by a commonly known method. For example, the polyolefin type resin particles can be produced by melt extruding polyolefin type resin with an extruder, and then granulating the resin by in-water cutting or strand cutting. Usually, the polyolefin type resin to use has a true spherical shape, an elliptic spherical shape (egg shape), a cylindrical shape, a rectangular shape, a pelletized shape or a granular shape, for example. Hereinafter, the polyolefin type resin particles may be referred to as micropellets.

The polyolefin type resin may include a radical scavenger. The radical scavenger may be adding to the polyolefin type resin in advance or at the same time as the melt extrusion. Preferably, the radical scavenger is a compound having an effect of scavenging radicals such as a polymerization inhibitor (including polymerization retardant), a chain transfer agent, an antioxidizing agent and a hindered amine light stabilizer, and hard to dissolve in water.

Examples of the polymerization inhibitor include phenol type polymerization inhibitors, nitroso type polymerization inhibitors, aromatic amine type polymerization inhibitors, phosphite type polymerization inhibitors and thioether type polymerization inhibitors such as t-butylhydroquinone, para-methoxyphenol, 2,4-dinitrophenol, t-butylcatechol, sec-propylcatechol, N-methyl-N-nitrosoaniline, N-nitrosophenylhydroxylamine, triphenyl phosphite, tris(nonylphenyl phosphite), triethyl phosphite, tris(2-ethylhexyl) phosphite, tridecyl phosphite, tris(tridecyl) phosphite, diphenyl mono(2-ethylhexyl) phosphite, diphenyl monodecyl phosphite, diphenyl mono(tridecyl) phosphite, dilauryl hydrogen phosphite, tetraphenyl dipropyleneglycol diphosphite and tetraphenyl tetra(tridecyl)pentaerythritol tetraphosphite.

Examples of the chain transfer agent include β-mercaptopropionic acid 2-ethylhexyl ester, dipentaerythritol hexakis (3-mercaptopropionate) and tris[(3-mercaptopropionyloxy)-ethyl]isocyanurate.

Examples of the antioxidizing agent include phenol type antioxidizing agents, phosphorus type antioxidizing agents and amine type antioxidizing agents such as 2,6-di-t-butyl-4-methylphenol (BHT), n-octadecyl-3-(3,5-di-t-butyl-4-hydroxyphenyl)propionate, pentaerythrityl-tetrakis[3-(3,5-di-t-butyl-4-hydroxyphenyl)propionate], 1,3,5-tris(3,5-di-tert-butyl-4-hydroxybenzyl)isocyanurate, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5.5]undecane, distearyl pentaerythritol diphosphite, tris(2,4-di-t-butylphenyl)phosphite, bis(2,4-di-t-butylphenyl)pentaerythritol diphosphite, tetrakis(2,4-di-t-butylphenyl) 4,4'-biphenylene diphosphonite, bis(2-t-butyl-4-methylphenyl)pentaerythritol diphosphite, 2,4,8,10-tetra-t-butyl-6-[3-(3-methyl-4-hydroxy-5-t-butylphenyl) propoxy]dibenzo[d,f][1,3,2]dioxaphosphepin, phenyl-1-naphthylamine, octylated diphenylamine, 4,4-bis(α,α-dimethylbenzyl)diphenylamine and N,N'-di-2-naphthyl-p-phenylenediamine.

Examples of the hindered amine type light stabilizer include bis(2,2,6,6-tetramethyl-4-piperidyl)sebacate, bis(1, 2,2,6,6-pentamethyl-4-piperidyl)sebacate and bis(1,2,2,6,6-pentamethyl-4-piperidyl)-2-(3,5-di-t-butyl-4-hydroxybenzyl)-2-n-butylmalonate.

Preferably, 0.005 to 0.5 parts by weight of the radical scavenger is used with respect to 100 parts by weight of the polyolefin type resin.

In addition, the polyolefin type resin may contain a foam regulator such as talc, calcium silicate, calcium stearate, synthetic or naturally produced silicon dioxide, ethylenebisstearic acid amide and methacrylate copolymer; a flame retardant such as triallyl isocyanurate hexabromide; and a colorant such as carbon black, iron oxide and graphite.

Next, the micropellets are dispersed in an aqueous medium in a polymerization vessel and impregnated with styrene type monomer while the styrene type monomer is being polymerized.

Examples of the aqueous medium include water, and a mixed medium of water and a water-soluble solvent (for example, alcohol). A solvent (plasticizer) such as toluene, xylene, cyclohexane, ethyl acetate, the di-isobutyl adipate may be added to the styrene type monomer.

Preferably, the amount of the styrene type monomer to use is 120 to 560 parts by weight with respect to 100 parts by weight of the polyolefin type resin particles. More preferably, the amount is 140 to 450 parts by weight, and even more preferably the amount is 150 to 400 parts by weight.

When the amount of the styrene type monomer is more than 560 parts by weight, the styrene type monomer may fail to be involved in the impregnation of the polyolefin type resin particles to generate particles consisting only of polystyrene type resin. Besides, the chemical resistance as well as the cracking resistance of the expanded molded article may be reduced. On the other hand, when the amount is less than 120 parts by weight, the ability of the expandable composite resin particles to retain a blowing agent may be reduced. As a result of the reduction, high expansion will be difficult. In addition, the stiffness of the expanded molded article may be reduced.

The impregnation of the polyolefin type resin particles with the styrene type monomer may be carried out at the same time as the polymerization or before starting the polymerization. It is however preferable that the impregnation is carried out at the same time as the polymerization. When the polymerization is carried out after the impregnation, the polymerization of the styrene type monomer is more likely in the vicinity of the surfaces of the polyolefin type resin particles. In this case, the styrene type monomer not involved in the impregnation of the polyolefin type resin particles may be independently polymerized to generate a large amount of polystyrene type resin fine particles.

When the impregnation is carried out at the same time as the polymerization, the polyolefin type resin particles with respect to which the above-mentioned content is calculated mean particles composed of the polyolefin type resin, the styrene type monomer involved in the impregnation, and the polystyrene type resin derived from the styrene type monomer involved in the impregnation and already polymerized.

In order to maintain the content percentage to 0 to 35% by weight, the styrene type monomer may be added into the aqueous medium in the polymerization vessel successively or intermittently. In particular, it is preferable to add the styrene type monomer into the aqueous medium gradually.

For the polymerization of the styrene type monomer, an oil-soluble radical polymerization initiator can be used. As the polymerization initiator, any polymerization initiator generally used for polymerization of styrene type monomer can be used. Examples thereof include organic peroxides such as benzoyl peroxide, lauroyl peroxide, t-butyl peroxyoctoate, t-hexyl peroxyoctoate, t-butyl peroxybenzoate, t-amyl peroxybenzoate, t-butyl peroxypivalate, t-butyl peroxyisopropyl carbonate, t-hexyl peroxyisopropyl carbonate, t-butyl peroxy-3,3,5-trimethylcyclohexanoate, di-t-butyl peroxyhexahydrotelephtalate, 2,2-di-t-butyl peroxybutane, di-t-hexyl peroxide and dicumyl peroxide; and azo compounds such as azobisisobutylonitrile and azobisdimethylvaleronitrile. These oil-soluble radical polymerization initiators may be used independently or in combination.

As the method for adding a polymerization initiator into the aqueous medium in the polymerization vessel, various kinds of methods may be mentioned. Examples thereof include (a) a method in which the polymerization initiator is dissolved and contained in the styrene type monomer in a vessel different from the polymerization vessel, and then the styrene type monomer is fed to the polymerization vessel;

(b) a method in which the polymerization initiator is dissolved in some of the styrene type monomer, a solvent or a plasticizer such as isoparaffin to prepare a solution, and then the solution and a predetermined amount of the styrene type monomer are fed to the polymerization vessel at the same time; and (c) a method in which the polymerization initiator is dispersed in an aqueous medium to prepare a dispersion, and then the dispersion and the styrene type monomer are fed to the polymerization vessel.

Usually, the polymerization initiator is preferably used at a proportion of 0.02 to 2.0% by weight with respect to the total amount of the styrene type monomer to use.

Preferably, a water-soluble radical polymerization inhibitor is dissolved in the aqueous medium. The water-soluble radical polymerization inhibitor can inhibit polymerization of the styrene type monomer in the surfaces of the polyolefin type resin particles. In addition, this inhibitor can prevent the styrene type monomer suspended in the aqueous medium from being independently polymerized to reduce generation of polystyrene type resin fine particles.

As the water-soluble radical polymerization inhibitor, a polymerization inhibitor that can dissolve in an amount of 1 g or more in 100 g of water may be used. Examples thereof include thiocyanates such as ammonium thiocyanate, zinc thiocyanate, sodium thiocyanate, potassium thiocyanate and aluminium thiocyanate; nitrites such as sodium nitrite, potassium nitrite, ammonium nitrite, calcium nitrite, silver nitrite, strontium nitrite, cesium nitrite, barium nitrite, magnesium nitrite, lithium nitrite and dicyclohexylammonium nitrite; water-soluble sulfur containing organic compounds such as mercaptoethanol, monothiopropylene glycol, thioglycerol, thioglycolic acid, thiohydracrylic acid, thiolactic acid, thiomalic acid, thioethanolamine, 1,2-dithioglycerol, 1,3-dithioglycerol; and ascorbic acid and sodium ascorbate. Out of them, nitrites are particularly preferable.

Preferably, the water-soluble radical polymerization inhibitor is used in an amount of 0.001 to 0.04 parts by weight with respect to 100 parts by weight of the water in the aqueous medium.

Preferably, a dispersant is added to the aqueous medium. Examples of the dispersant include organic dispersants such as partially saponified polyvinyl alcohol, polyacrylate, polyvinylpyrrolidone, carboxymethylcellulose and methylcellulose; and inorganic dispersants such as magnesium pyrophosphate, calcium pyrophosphate, calcium phosphate, calcium carbonate, magnesium phosphate, magnesium carbonate and magnesium oxide. Out of them, inorganic dispersants are preferable.

When an inorganic dispersant is used, it is preferable to use a surfactant in combination. Examples of the surfactant include sodium dodecylbenzenesulfonate and sodium α-olefinsulfonate.

The shape and the structure of the polymerization vessel is not particularly limited, as long as they are conventionally used for suspension polymerization of styrene type monomer.

The shape of the stirring wing is not particularly limited, and specific examples thereof include paddle wings such as V-type paddle wing, Pfaudler wing, inclined paddle wing, flat paddle wing and Pullmargine wing; turbine wings such as turbine wing and fan turbine wing; and propeller wings such as marine propeller wing. Out of these stirring wings, paddle wing is preferable. The stirring wing may be a single stage wing or a multiple stage wing. The polymerization vessel may be provided with a baffle.

The temperature of the aqueous medium for the polymerization of the styrene type monomer in the micropellets is not particularly limited, and is preferably in a range of −30 to +20° C. of the melting point of the polyolefin type resin to use. More specifically, the temperature of the aqueous medium is preferably 70 to 140° C., and more preferably 80 to 130° C. Moreover, the temperature of the aqueous medium may be a constant temperature during the term from initiation to completion of the polymerization of the styrene type monomer, or may be raised stepwise. When the temperature of the aqueous medium is raised, the temperature is preferably raised at a temperature raising rate of 0.1 to 2° C./min.

Further, when particles composed of cross-linked polyolefin type resin are used, the cross-linking may be performed in advance before the impregnation with the styrene type monomer, may be performed at the same time as the impregnation of the micropellets with the styrene type monomer and the polymerization or may be performed after the impregnation of the micropellets with the styrene type monomer and the polymerization.

Examples of a cross-linking agent used for cross-linking the polyolefin type resin include organic peroxides such as 2,2-di-t-butyl-peroxybutane, dicumyl peroxide and 2,5-dimethyl-2,5-di-t-butyl peroxyhexane. These cross-linking agents may be used independently or in combination of two or more kinds thereof. Usually, the cross-linking agent is preferably used in an amount of 0.05 to 1.0 parts by weight with respect to 100 parts by weight of the polyolefin type resin particles (micropellets).

Examples of the method for adding the cross-linking agent include a method in which the cross-linking agent is directly added to the polyolefin type resin; a method in which the cross-linking agent is dissolved in a solvent, a plasticizer or the styrene type monomer, and then the solution is added; and a method in which the cross-linking agent is dispersed in water, and then the dispersion is added. Out of them, preferable is the method in which the cross-linking agent is dissolved in the styrene type monomer, and then the solution is added.

Expandable resin particles can be obtained by impregnating the polystyrene type resin particles with a volatile blowing agent (hereinafter, may be simply referred to as blowing agent) in the presence of the first antistatic agent. The impregnation with the blowing agent itself can be performed by a commonly known method. Examples thereof include a method for impregnation with the blowing agent by flowing the polystyrene type resin particles in a hermetic pressure-resistant container being a V-type, C-type or DC-type rotation mixer, and introducing the blowing agent and the first antistatic agent thereto; a method for impregnation with the blowing agent by suspending the polystyrene type resin particles in an aqueous medium in a hermetic pressure-resistant container equipped with a stirrer, and the blowing agent and the first antistatic agent are introduced thereto; and a method for impregnation with the blowing agent by pressing the blowing agent and the antistatic agent in a hermetic container in which the polymerization reaction of the styrene type monomer has been carried out.

Preferably, the impregnation with the blowing agent is performed at an atmospheric temperature of 30 to 80° C. under a pressure of 0.05 to 0.12 MPa for 0.5 to 6 hours. Preferably, the contact with the first antistatic agent is performed at an atmospheric temperature of 20 to 80° C. under a pressure of 0.01 to 0.12 MPa for, as in the case of the blowing agent, 0.5 to 6 hours. When the impregnation with the blowing agent and the contact with the antistatic agent are performed outside the ranges of temperature, pressure and period of time, the blowing agent and the antistatic agent may not be sufficiently contained in the resin, and the particles may not be expanded to a desired bulk expansion ratio or the antistatic properties may be insufficient. The pressure referred to means a pressure based on atmospheric pressure.

Preferably, the polystyrene type resin particles have an average particle diameter of 800 to 2400 μm. Having an average particle diameter of less than 800 μm, the composite resin particles tend to deteriorate in the ability of retaining the blowing agent and have a shorter life as beads. Having an average particle diameter of more than 2400 μm, the composite resin particles tend to deteriorate in the ability of filling the mold when an expanded molded article having a complicated shape is molded. More preferably, the average particle diameter is 1200 to 2000 μm.

As the volatile blowing agent, various kinds of commonly known blowing agents can be used. Examples thereof include propane, n-butane, isobutane, n-pentane, isopentane, industrial pentane, petroleum ether, cyclohexane and cyclopentane, which are used independently or as a mixture. Out of these, propane, n-butane, isobutane, n-pentane, isopentane and cyclopentane are preferable.

Preferably, the content percentage of the blowing agent is 6 to 12% by weight with respect to the expandable resin particles. When the content percentage of the blowing agent is less than 6% by weight, the expandability of the expandable resin particles may be reduced. When the expandability is reduced, it will be difficult to obtain pre-expanded particles of a higher bulk expansion ratio and a lower bulk density, and an expanded molded article to be obtained by molding the pre-expanded particles in a mold may have a reduced fusion ratio to have reduced resistance to cracking. On the other hand, when the content percentage is more than 12% by weight, the foam size in the pre-expanded particles will easily be too large, and therefore the moldability thereof may be reduced and an expanded molded article to be obtained therefrom may be reduced in strength properties such as compression strength and bending strength. More preferably, the content percentage of the blowing agent is in a range of 7.5 to 11% by weight.

The first antistatic agent in the impregnation with the blowing agent is not particularly limited, and any commonly known antistatic agent can be used. Examples thereof include a surfactant having antistatic properties. Specific examples of the surfactant include nonionic surfactants such as alkyl monoethanolamine, alkyl polyetheramine, polyethylene glycol fatty acid ester, alkyl diethanolamide, alkyl diethanolamine and polyalkylene glycol derivative; anionic surfactants such as alkyl sulfonate, alkyl benzene sulfonate and alkyl phosphate; cationic surfactants such as aliphatic alkyl quaternary ammonium salt and trialkylbenzylammonium salt; and amphoteric surfactants such as alkyl betaine and alkylimidazoliumbetaine. It is preferable to use a surfactant having 5 to 20 carbon atoms in total as the antistatic agent, though it depends on the kind of the surfactant. Two or more kinds of the surfactants may be used.

A specified part by weight of the first antistatic agent in a solution state or a liquid state with respect to the polystyrene type resin particles can be used for the impregnation of the polystyrene type resin particles. The solution state means that the antistatic agent, solid or liquid, is dissolved or dispersed in an aqueous medium or an organic solvent, and the liquid state means that the antistatic agent itself is liquid.

Out of them, nonionic surfactants are preferable, among which alkyl monoethanolamine, alkyl diethanolamine and alkyl polyetheramine are preferable in terms of their good antistatic properties. Preferably, the alkyl has 8 to 18 carbon atoms. In particular, an antistatic agent that is in a liquid state at a temperature of 10 to 30° C. is preferable in that the expandable resin particles can be impregnated with the antistatic agent in a short period of time without dissolving the antistatic agent in an aqueous medium or an organic solvent. Examples of such an antistatic agent include alkyl monoethanolamine and alkyl diethanolamine (the alkyl preferably has 8 to 18 carbon atoms), and polyoxyethylene alkylamine (the alkyl preferably has 8 to 18 carbon atoms, for example, polyoxyethylenelaurylamine). In the polyoxyethylene alkylamine, the polyoxyethylene preferably has 2 to 10 oxyethylene units.

The first antistatic agent is used in an amount of 0.1 to 2.0 parts by weight, preferably 0.15 to 1.5 parts by weight with respect to 100 parts by weight of the polystyrene type resin particles. When the amount is less than 0.1 parts by weight, it may be impossible to give desired antistatic properties to the expanded molded article. On the other hand, when the amount is more than 2.0 parts by weight, the productivity may be reduced due to, for example, foaming occurring while a slurry of the expandable composite resin particles and the aqueous medium is being carried, or the expandable composite resin particles may be sticky due to the excessive surfactant to complicate handling of the particles in the pre-expansion.

When the volatile blowing agent is suspended in an aqueous medium to perform the impregnation, a water-soluble surfactant may be added at the same time generally for prevention of fusion between particles and for uniform absorption of the blowing agent. Here, the surfactant is used to play a role of the antistatic agent in the present invention, but a surfactant may be used to play its primary role. That is, an anionic surfactant can be used for efficient contact between the first antistatic agent and the resin. Examples of the anionic surfactant include commonly known anionic surfactants such as alkyl sulfonate, alkyl benzene sulfonate and alkyl phosphate. The anionic surfactant is added preferably in an amount of 0.01 to 0.1 parts by weight, and more preferably in an amount of 0.02 to 0.08 parts by weight with respect to 100 parts by weight of the aqueous medium. When the amount is less than 0.01 parts by weight, it may be difficult to give sufficient properties. When the amount is more than 0.1 parts by weight, foaming may be intense while a slurry of the expandable resin particles and the aqueous medium is being carried.

(2) Next, the expandable resin particles impregnated with the volatile blowing agent are brought into contact with a specific amount of a second antistatic agent in the presence of an antifoaming agent, and then pre-expand to obtain pre-expanded particles.

The second antistatic agent is not particularly limited, and any commonly known surfactant can be used as the antistatic agent. Specific examples of the surfactant include nonionic surfactants such as alkyl monoethanolamine, alkyl polyetheramine, polyethylene glycol fatty acid ester, alkyl diethanolamide, alkyl diethanolamine and polyalkylene glycol derivative; anionic surfactants such as alkyl sulfonate, alkyl benzene sulfonate and alkyl phosphate; cationic surfactants such as aliphatic alkyl quaternary ammonium salt and trialkylbenzylammonium salt; and amphoteric surfactants such as alkyl betaine and alkylimidazoliumbetaine. It is preferable to use a surfactant having 5 to 20 carbon atoms in total as the antistatic agent, though it depends on the kind of the surfactant. Two or more kinds of the surfactants may be used.

One of the characteristics of the present invention is that the kind of the second antistatic agent is not limited and those which have been conventionally difficult to use due to foaming can be also used. In the present invention, therefore, cationic surfactants such as, for example, aliphatic alkyl quaternary ammonium salt and trialkylbenzylammonium salt can be also used, which have good antistatic properties but were difficult to use due to foaming.

A specified part by weight of the second antistatic agent in a solution state or a liquid state with respect to the expandable resin particles can be brought into contact with the expandable resin particles. The solution state means that the antistatic agent, solid or liquid, is dissolved or dispersed in an aqueous medium or an organic solvent, and the liquid state means that the antistatic agent itself is liquid.

The second antistatic agent is used in an amount of 0.1 to 2.0 parts by weight, preferably 0.2 to 1.5 parts by weight with respect to 100 parts by weight of the expandable resin particles. When the amount is less than 0.1 parts by weight, it may be impossible to give desired antistatic properties to the expanded molded article. On the other hand, when the amount is more than 2.0 parts by weight, the expandable resin particles and the pre-expanded particles may be sticky to complicate handling of the particles. Further, it may be difficult to fill a mold with the pre-expanded particles, and the resulting expanded molded article may be sticky to have an opposite effect of easily attracting dust.

Here, the amount of the first antistatic agent used in the impregnation with the blowing agent and the amount of the second antistatic agent used in the pre-expansion are at a ratio by weight of 1:0.1 to 10. When the ratio by weight of the amount of the second antistatic agent used in the pre-expansion is less than 0.1, desired antistatic properties may not be obtained. When the ratio by weight is more than 10, the pre-expanded particles may be sticky and production costs may increase.

Furthermore, the total amount of the first antistatic agent in the impregnation with the blowing agent and the second antistatic agent in the pre-expansion is preferably in a range of 0.35 to 3.0 parts by weight with respect to 100 parts by weight of the styrene type resin particles. When the total amount is less than 0.35 parts by weight, desired antistatic properties may not be obtained. When the total amount is more than 3.0 parts by weight, the pre-expanded particles may be sticky and production costs may increase. More preferably, the total amount is 0.5 to 2.5 parts by weight.

Preferably, the contact between the second antistatic agent and the expandable resin particles is carried out at an atmosphere temperature of 30 to 90° C. for 5 to 90 seconds. The contact carried out outside the ranges of temperature and period of time may cause insufficient antistatic properties, reduced productivity and sticky expandable composite resin particles. The antistatic agent may be brought into contact with the expandable resin particles under pressure, if necessary.

The contact between the expandable resin particles and the second antistatic agent is carried out in such a way that the antistatic agent in a solution state or a liquid state is brought into contact with the expandable resin particles in a container to be used for the pre-expansion. Preferably, the contact is carried out by spraying the antistatic agent in a solution state or a liquid state, or adding the antistatic agent from a top of the pre-expander. In the case of spraying, the position of the spraying relative to the container is not particularly limited. It is however preferable that the position is as close as possible to the expandable resin particles, because adhesion of the antistatic agent to the container and an stirring blade can be prevented, and the antistatic agent can be brought into contact with the expandable resin particles efficiently. Here, it is preferable that the close position is not more than 80 cm away from the top of the expandable resin particles.

The antifoaming agent is not particularly limited, as long as it prevents foaming due to the second antistatic agent. Examples of the antifoaming agent generally referred to and commonly known include antifoaming agents based on lower alcohols such as methanol and ethanol; antifoaming agents based on organic polar compounds such as amyl alcohol, metallic soap and water-insoluble nonionic surfactant; antifoaming agents based on mineral oil; and antifoaming agents based on silicones such as silicone resin and a blended product of silicone resin and a surfactant. Within the range of the commonly known antifoaming agents, antifoaming agents based on organic polar compounds are preferable, and nonionic surfactants that are water-insoluble or have an HLB value of 9 or less are more preferable, because they can be used without lessening good antistatic properties and sustain their antifoaming effect.

Examples of the nonionic surfactants include polyoxyalkylene glycols such as polyoxyethylene glycol, polyoxypropylene glycol and polyoxyethylene polyoxypropylene glycol; polyoxyalkylene alkyl ethers such as polyoxyalkylene lauryl ether, polyoxyethylene oleyl cetyl ether and polyoxyethylene lauryl ether; and sorbitan fatty acid esters such as sorbitan monooleate.

Preferably, the antifoaming agent is used at a ratio by weight to the second antistatic agent of 1:0.04 to 1.50 (second antistatic agent:antifoaming agent). When the antifoaming agent is used at a ratio less than 1:0.04, defoaming effect may be insufficient, and it may be difficult to obtain the pre-expanded particles. When the antifoaming agent is used at a ratio more than 1:1.50, it may be difficult to obtain good antistatic properties. The ratio by weight is more preferably 1:0.05 to 1.25, and even more preferably 1:0.05 to 1.20.

The pre-expanded particles can be obtained by bringing the expandable resin particles into contact with the second antistatic agent in the presence of the antifoaming agent, and then, if necessary, heating the particles with a heating medium such as steam to pre-expand the particles to a predetermined bulk density.

Preferably, the pre-expanded particles have a bulk expansion ratio of 5 to 60 (bulk density: 0.016 to 0.2 g/cm$^3$). More preferably, the bulk expansion ratio is 10 to 55. When the bulk expansion ratio is more than 60, the closed cell ratio of the expanded particles may be reduced, and an expanded molded article to be obtained by expanding the pre-expanded particles may have reduced strength. On the other hand, when the bulk expansion ratio is less than 5, an expanded molded article to be obtained by expanding the pre-expanded particles may have increased weight.

The antifoaming agent may be mixed with the second antistatic agent or mixed with the expandable resin particles in advance for use. In particular, the former is simple and easy.

(3) Method for Producing Expanded Molded Article

An expanded molded article having a desired shape can be obtained by pouring the pre-expanded particles into a mold of a molding machine, and secondarily expanding the same by heating to fuse and integrate the pre-expanded particles. For the molding machine, an EPS molding machine, which is used in the pertinent technical field can be used.

The resulting expanded molded article has good antistatic properties. The expanded molded article can be therefore used for shock absorbers (cushioning) for home electric appliances; and containers (packing materials) for conveying electronic components, various industrial materials and foods. Also, the expanded molded article can be used for core materials for vehicle bumpers, impact energy absorbers such as interior cushioning materials of doors.

EXAMPLES

Hereinafter, the present invention will be described with reference to examples; however, the present invention is not limited to the examples.

<Bulk Expansion Ratio of Pre-Expanded Particles>

Approximately 5 g of the pre-expanded particles is weighted for the weight (a) to two places of decimals. Next, the pre-expanded particles weighted are put into a 500 cm$^3$ measuring cylinder having a minimum memory unit of 5 cm$^3$. Thereto, a pressing tool composed of a circular resin plate having a diameter slightly smaller than the diameter of the measuring cylinder and a bar-like resin plate having a width of approximately 1.5 cm and a length of approximately 30 cm fixed upright to the center of the circular resin plate is applied to read the volume (b) of the pre-expanded particles. The bulk density (g/cm$^3$) of the pre-expanded particles is determined according to the formula (a)/(b). The bulk expansion ratio is an inverse of the bulk density, that is, the formula (b)/(a).

<Expansion Ratio of Expanded Molded Article>

A test piece (for example, 75×300×35 mm) cut out of an expanded molded article (dried at 40° C. for more than 20 hours after molding) is measured for the weight (a) and the volume (b) to three or more significant figures, respectively. The density (g/cm$^3$) of the expanded molded article is determined according to the formula (a)/(b). The ratio is an inverse of the density, that is, the formula (b)/(a).

<Average Surface Resistivity>

The measurement is performed according to the methods described in JIS K 6911:1995 "Testing methods for thermosetting plastics". That is, with testing equipment (a digital ultra-high resistance/micro current meter R8340 and a resistivity chamber R12702A, products by Advantest Corporation), electrodes are pressed into contact with a sample under a load of approximately 30 N to perform charging at 500 V for 1 minute, and then the sample was measured for the resistance. The surface resistivity is calculated from the measured value according to the following formula:

$$\rho s = \pi (D+d)/(D-d) \times Rs$$

ρs: surface resistivity (MΩ)
D: inner diameter of ring electrode on surface (cm)
d: shape (outer diameter) of inner circle of surface electrode (cm)
Rs: surface resistance (MΩ)

Ten samples are cut out of the same expanded molded article, each of which has a size of 100 mm×100 mm×10 mm in thick or smaller. The ten samples cut out are stored under an environment of a temperature of 20° C. and a humidity of 65% for around 24 hours, and then measured for the resistance. The average surface resistivity is the average of the surface resistivities of the ten samples.

<Standard Deviation>

The logarithms ($\log_{10}$) of the ten surface resistivities are obtained, respectively, and the standard deviation is determined using the logarithms obtained.

<Evaluation of Antistatic Properties>

When the average surface resistivity is less than $10^{11}$ and the standard deviation is 1.0 or less, the expanded molded article is evaluated as a good article (○) having excellent antistatic properties.

<Evaluation of Sustained Antistatic Properties>

The surface of the expanded molded article obtained is washed with pure water supplied at a rate of 100 ml per second from a faucet having a diameter of 1 cm for 1 minute, and then moisture attaching to the surface of the expanded molded article is removed with a paper towel. Ten samples are cut out of the same expanded molded article, each of which has a size of 100 mm×100 mm×10 mm in thick or smaller. The ten samples cut out are stored under an environment of a temperature of 20° C. and a humidity of 65% for 24 hours or more, and then measured for the surface resistivity to determine the average surface resistivity.

Example 1

Production of Resin Particles

To 100 parts by weight of ethylene-vinyl acetate copolymer resin particles (LV-211, melt flow rate: 0.3 g/10 minutes, vinyl acetate content: 6.2% by weight, product by Japan Polyethylene Corporation), 0.3 parts by weight of calcium silicate and 0.1 parts by weight of calcium stearate as foam regulators were added, and the mixture was uniformly kneaded with an extruder to obtain pellets granulated by in-water cutting (the ethylene-vinyl acetate copolymer resin particles were adjusted to weigh 80 mg per 100 particles).

Into a pressure-resistant container having a capacity of 100 liters equipped with a stirrer, 40 parts by weight of the above-described pellets, 120 parts by weight of pure water, 0.45 parts by weight of magnesium pyrophosphate, 0.02 parts by weight of sodium dodecylbenzenesulfonate were added and stirred to suspend the mixture in the pure water.

Subsequently, a mixture obtained by dissolving 0.03 parts by weight of dicumyl peroxide as a radical polymerization initiator in 20 parts by weight of styrene monomer was added to the suspension dropwise over 30 minutes. Thereafter, the suspension was retained for 30 minutes, and then the reaction was heated up to a temperature of 135° C., retained for 2 hours, and then cooled to normal temperature.

Further, 0.16 parts by weight of sodium dodecylbenzenesulfonate was added to the suspension, and then the reaction was heated up to a temperature of 90° C., and a mixture obtained by dissolving 0.3 parts by weight benzoyl peroxide, 0.02 parts by weight of t-butyl peroxybenzoate and 0.8 parts by weight of dicumyl peroxide as radical polymerization initiators in 40 parts by weight styrene monomer was added thereto dropwise over 2 hours to carry out polymerization and absorption of the styrene monomer at the same time. Thereafter, the reaction was retained at 90° C. for 3 hours, and then heated up to 135° C. and retained at the temperature for 3 hours to complete the polymerization. After completion of the series of polymerization, the reaction was cooled to normal temperature to obtain composite resin particles.

(Production of Expandable Resin Particles)

To a pressure-resistant container having a capacity of 100 liters equipped with a stirrer, 100 parts by weight of the resin particles, 0.3 parts by weight of water-insoluble alkyl monoethanolamine (Nymeen L-201, N-hydroxyethyl laurylamine, product by NOF Corporation) and 0.04 parts by weight of sodium dodecyl benzenesulfonate as a first antistatic agent, and 100 parts by weight of water were put in and heated up to a temperature of 60° C. while sealed and stirred. After confirmation of rise of temperature up to 60° C., 13 parts by weight of isopentane as a blowing agent was added, and the mixture was retained at 60° C. for 3.5 hours, and then cooled to 25° C., whereupon expandable resin particles were taken out.

Production of Pre-Expanded Particles

To a batch expanding machine (SKK-70, product by Sekisui Machinery Co., Ltd.), 100 parts by weight of the expandable resin particles were put in, and a mixture of 0.36 parts by weight of aliphatic quaternary ammonium salt (Catiogen ES-OW, the number of carbon atoms of aliphatic group: approximately 6 to 10, product by Dai-ichi Kogyo Seiyaku Co., Ltd.) as a second antistatic agent and 0.04 parts by weight of polyoxyethylene polyoxypropylene glycol (Epan 710, product by Dai-ichi Kogyo Seiyaku Co., Ltd.) as an antifoaming agent was added under stirring. After retention for 30 seconds, heating was started while steam was being introduced at a gage pressure of approximately 0.05 MPa to obtain pre-expanded particles having a bulk expansion ratio of approximately 40. The mixture of the second antistatic agent and the antifoaming agent was added from the top of the batch expanding machine (approximately 80 cm above the top of the expandable resin particles put in). The gage pressure means a pressure based on atmospheric pressure.

Production of Expanded Molded Article

The resulting pre-expanded particles were put into a mold having a size of 400 mm (length)×300 mm (width)×30 mm (thickness). The mold was heated by introducing steam at a gage pressure of 0.06 MPa for 25 seconds and cooled for 120 seconds, whereupon an expanded molded article of an expansion ratio of approximately 40 was taken out. The resulting expanded molded article was dried in a drying room at 40° C. for approximately 8 hours.

The resulting expanded molded article was determined for the average surface resistivity, the result of which is shown together with the evaluation of the antistatic properties in Table 1.

Example 2

An expanded molded article was obtained in the same manner as in Example 1 except that the amount of the sodium dodecyl benzenesulfonate added as the first antistatic agent was changed to 0.06 parts by weight in the step of the impregnation with the volatile blowing agent.

The resulting expanded molded article was determined for the average surface resistivity, the result of which is shown together with the evaluation of the antistatic properties in Table 1.

Example 3

An expanded molded article was obtained in the same manner as in Example 1 except that, as the first antistatic agent, the amount of the alkyl monoethanolamine was changed to 0.6 parts by weight, and the amount of the sodium dodecyl benzenesulfonate was changed to 0.02 parts by weight in the step of the impregnation with the volatile blowing agent.

The resulting expanded molded article was determined for the average surface resistivity, the result of which is shown together with the evaluation of the antistatic properties in Table 1.

Example 4

An expanded molded article was obtained in the same manner as in Example 1 except that the amount of the sodium dodecyl benzenesulfonate added as the first antistatic agent was changed to 0.02 parts by weight in the step of the impregnation with the volatile blowing agent.

The resulting expanded molded article was determined for the average surface resistivity, the result of which is shown together with the evaluation of the antistatic properties in Table 1.

Example 5

An expanded molded article was obtained in the same manner as in Example 1 except that the amount of the aliphatic quaternary ammonium salt added as the second antistatic agent was changed to 0.38 parts by weight and the amount of the polyoxyethylene polyoxypropylene glycol added as the antifoaming agent was changed to 0.02 parts by weight in the step of the pre-expansion.

The resulting expanded molded article was determined for the average surface resistivity, the result of which is shown together with the evaluation of the antistatic properties in Table 1.

Example 6

An expanded molded article was obtained in the same manner as in Example 1 except that the amount of the aliphatic quaternary ammonium salt added as the second antistatic agent was changed to 1.24 parts by weight and the amount of the polyoxyethylene polyoxypropylene glycol added as the antifoaming agent was changed to 0.16 parts by weight in the step of the pre-expansion.

The resulting expanded molded article was determined for the average surface resistivity, the result of which is shown together with the evaluation of the antistatic properties in Table 1.

Example 7

An expanded molded article was obtained in the same manner as in Example 1 except that the antifoaming agent was changed to polyoxyalkylene alkylether (DKS NL-Dash 400, product by Dai-ichi Kogyo Seiyaku Co., Ltd.) in the step of the pre-expansion.

The resulting expanded molded article was determined for the average surface resistivity, the result of which is shown together with the evaluation of the antistatic properties in Table 1.

Example 8

An expanded molded article was obtained in the same manner as in Example 1 except that polyoxyethylene alkylamine (Elegan S-100, product by NOF Corporation) was used as the first antistatic agent in the step of the impregnation with the volatile blowing agent.

The resulting expanded molded article was determined for the average surface resistivity, the result of which is shown together with the evaluation of the antistatic properties in Table 1.

Example 9

An expanded molded article was obtained in the same manner as in Example 1 except that the amount of the aliphatic quaternary ammonium salt added as the second antistatic agent was changed to 0.27 parts by weight and the amount of the polyoxyethylene polyoxypropylene glycol added as the antifoaming agent was changed to 0.13 parts by weight in the step of the pre-expansion.

The resulting expanded molded article was determined for the average surface resistivity, the result of which is shown together with the evaluation of the antistatic properties in Table 1.

Example 10

An expanded molded article was obtained in the same manner as in Example 1 except that the amount of the aliphatic quaternary ammonium salt added as the second antistatic agent was changed to 0.20 parts by weight and the amount of the polyoxyethylene polyoxypropylene glycol added as the antifoaming agent was changed to 0.20 parts by weight in the step of the pre-expansion.

The resulting expanded molded article was determined for the average surface resistivity, the result of which is shown together with the evaluation of the antistatic properties in Table 1.

Comparative Example 1

An expanded molded article was supposed to be obtained in the same manner as in Example 1 except that the amount of the aliphatic quaternary ammonium salt added as the second antistatic agent was changed to 0.399 parts by weight and the amount of the polyoxyethylene polyoxypropylene glycol added as the antifoaming agent was changed to 0.001 parts by weight in the step of the pre-expansion, but foaming was intense to prevent the pre-expansion.

Comparative Example 2

An expanded molded article was supposed to be obtained in the same manner as in Example 1 except that the antifoaming agent was changed to a silicone fluid (KS-512, product by Shin-Etsu Chemical Co., Ltd.) in the step of the pre-expansion, but the silicone fluid failed to be mixed with a solution of the second antistatic agent to prevent the pre-expansion.

Comparative Example 3

An expanded molded article was obtained in the same manner as in Example 1 except that the antifoaming agent was changed to a silicone emulsion (KM-73, product by Shin-Etsu Chemical Co., Ltd.) in the step of the pre-expansion.

The resulting expanded molded article was determined for the average surface resistivity, the result of which is shown together with the evaluation of the antistatic properties in Table 2.

Comparative Example 4

An expanded molded article was obtained in the same manner as in Example 1 except that the antifoaming agent was not used and 0.6 parts by weight of polyoxyethylene alkylamine (Elegan 5-100, the number of repeating of the oxyethylene unit: approximately 1 to 4, the number of carbon atoms of the alkyl: approximately 10 to 14, product by NOF Corporation) was used as the second antistatic agent in the step of the pre-expansion.

The resulting expanded molded article was determined for the average surface resistivity, the result of which is shown together with the evaluation of the antistatic properties in Table 2.

BA=blowing agent, AS=Antistatic, AF=antifoaming,
pbw=parts by weight, SF=Surface resistance, SD=Standard deviation
AMEA=Alkyl monoethanolamine, PEAA=Polyoxyethylene alkylamine
SDBS=Sodium dodecylbenzenesulfonate
AQAS=Aliphatic quaternary ammonium salt,
PEPPG=Polyoxyethylene polyoxypropylene glycol,
PAAE=Polyoxyalkylene alkylether Examples and Comparative Examples 2 to 4 indicate that it is possible to obtain an expanded molded article having better antistatic properties when a specific kind of antifoaming agent is used.

Furthermore, it is indicated that the antistatic properties are sustained even after the washing with water in Examples.

The invention claimed is:

1. A process for producing pre-expanded particles, comprising:

impregnating 100 parts by weight of polystyrene type resin particles with a volatile blowing agent in the presence of 0.1 to 2.0 parts by weight of a first antistatic agent to obtain expandable resin particles; and bringing 100 parts by weight of the expandable resin particles into contact with 0.1 to 2.0 parts by weight of a second antistatic agent in the presence of an antifoaming agent, and then pre-expanding the particles, thereby obtaining pre-expanded particles, wherein the second antistatic agent and the antifoaming agent are used in a ratio by weight of 1:0.04 to 1.50,

TABLE 1

| | Impregnation with BA | | Pre-expansion | | | | | | | Surface |
| --- | --- | --- | --- | --- | --- | --- | --- | --- | --- | --- |
| | AS agent | Amount added (pbw) | AS agent | AF agent | Mixing ratio (weight) | Amount of mixture (pbw) | Amount of AS agent (pbw) | Amount of AF agent (pbw) | Foaming | SR/SD/ Evaluation ($\Omega/cm^2$) | resistivity after washing ($\Omega/cm^2$) |
| Ex. 1 | AMEA SDBS | 0.3 0.04 | AQAS | PEPPG | 8:1 | 0.4 | 0.36 | 0.04 | No | $8 \times 10^9$/ 0.4/o | $3 \times 10^{10}$ |
| Ex. 2 | AMEA SDBS | 0.3 0.06 | AQAS | PEPPG | 8:1 | 0.4 | 0.36 | 0.04 | No | $6 \times 10^9$/ 0.4/o | $2 \times 10^{10}$ |
| Ex. 3 | AMEA SDBS | 0.6 0.02 | AQAS | PEPPG | 8:1 | 0.4 | 0.36 | 0.04 | No | $6 \times 10^9$/ 0.4/o | $3 \times 10^{10}$ |
| Ex. 4 | AMEA SDBS | 0.3 0.02 | AQAS | PEPPG | 8:1 | 0.4 | 0.36 | 0.04 | No | $9 \times 10^9$/ 0.6/o | $6 \times 10^{10}$ |
| Ex. 5 | AMEA SDBS | 0.3 0.04 | AQAS | PEPPG | 16:1 | 0.4 | 0.38 | 0.02 | No | $8 \times 10^9$/ 0.4/o | $2 \times 10^{10}$ |
| Ex. 6 | AMEA SDBS | 0.3 0.04 | AQAS | PEPPG | 8:1 | 1.4 | 1.24 | 0.16 | No | $5 \times 10^9$/ 0.4/o | $1 \times 10^{10}$ |
| Ex. 7 | AMEA SDBS | 0.3 0.04 | AQAS | PAAE | 8:1 | 0.4 | 0.36 | 0.04 | No | $8 \times 10^9$/ 0.5/o | $5 \times 10^{10}$ |
| Ex. 8 | PEAA SDBS | 0.3 0.04 | AQAS | PEPPG | 8:1 | 0.4 | 0.36 | 0.04 | No | $7 \times 10^9$/ 0.6/o | $3 \times 10^{10}$ |
| Ex. 9 | AMEA SDBS | 0.3 0.04 | AQAS | PAAE | 2:1 | 0.4 | 0.27 | 0.13 | No | $8 \times 10^9$/ 0.5/o | $7 \times 10^{10}$ |
| Ex. 10 | AMEA SDBS | 0.3 0.04 | AQAS | PEPPG | 1:1 | 0.4 | 0.20 | 0.20 | No | $8 \times 10^9$/ 0.8/o | $8 \times 10^{10}$ |

TABLE 2

| | Impregnation with BA | | Pre-expansion | | | | | | | Surface |
| --- | --- | --- | --- | --- | --- | --- | --- | --- | --- | --- |
| | AS agent | Amount added (pbw) | AS agent | AF agent | Mixing ratio (weight) | Amount of mixture (pbw) | Amount of AS agent (pbw) | Amount of AF agent (pbw) | Foaming | SR/SD/ Evaluation ($\Omega/cm^2$) | resistivity after washing ($\Omega/cm^2$) |
| Com. Ex. 1 | AMEA SDBS | 0.3 0.04 | AQAS | PEPPG | 40:1 | 0.4 | 0.399 | 0.001 | Yes | — | — |
| Com. Ex. 2 | AMEA SDBS | 0.3 0.04 | AQAS | Silicone fluid | 8:1 | — | — | — | — | — | — |
| Com. Ex. 3 | AMEA SDBS | 0.3 0.04 | AQAS | Silicone emulsion | 8:1 | 0.4 | 0.36 | 0.04 | No | $6 \times 10^{11}$/ 0.7/x | — |
| Com. Ex. 4 | AMEA SDBS | 0.3 0.04 | PEAA | — | — | 0.6 | 0.6 | — | No | $1 \times 10^{11}$/ 0.8/x | — |

Examples and Comparative Example 1 indicate that it is possible to obtain an expanded molded article having better antistatic properties when the ratio between the antifoaming agent and the second antistatic agent is in a specific range.

the first antistatic agent comprises a nonionic surfactant,
the second antistatic agent comprises a cationic surfactant, and
the antifoaming agent comprises a polyoxyalkylene glycol or polyoxyalkylene alkylether, and has a hydrophilic-lipophilic balance (HLB) value of 9 or less.

2. The process for producing pre-expanded particles according to claim 1, wherein obtaining the expandable resin particles comprises:
(1) flowing the polystyrene type resin particles and the first antistatic agent in a hermetic pressure-resistant container, or
(2) suspending the polystyrene type resin particles and the first antistatic agent in an aqueous medium in a hermetic pressure-resistant container,
and then impregnating the flowed or suspended polystyrene type resin particles with the volatile blowing agent.

3. The process for producing pre-expanded particles according to claim 1, wherein obtaining the pre-expanded particles comprises bringing the expandable resin particles into contact with the second antistatic agent in a liquid state or a solution of the second antistatic agent in the presence of the antifoaming agent, and then pre-expanding the particles.

4. The process for producing pre-expanded particles according to claim 1, wherein the volatile blowing agent is selected from propane, n-butane, isobutane, n-pentane, isopentane and cyclopentane.

5. The process for producing pre-expanded particles according to claim 1, wherein the volatile blowing agent is included in the expandable resin particles at a proportion of 6 to 12% by weight.

6. The process for producing pre-expanded particles according to claim 1, wherein the polystyrene type resin particles comprise composite resin particles of 100 parts by weight of polyolefin type resin and 120 to 560 parts by weight of polystyrene type resin.

7. Pre-expanded particles obtained by the process of claim 1.

8. An expanded molded article obtained by molding pre-expanded particles of claim 7 in a mold.

* * * * *